US007767747B2

(12) United States Patent
Lind et al.

(10) Patent No.: US 7,767,747 B2
(45) Date of Patent: Aug. 3, 2010

(54) SILICONE POLYMER AND ORGANIC POLYMER CONTAINING ALLOY AND/OR HYBRID EMULSION COMPOSITIONS

(75) Inventors: David Lind, West Pennant Hills (AU); Deborah Meyers, Midland, MI (US); Marilyn Shope, Sanford, MI (US)

(73) Assignee: Dow Corning Corporation, Midland, MI (US)

( * ) Notice: Subject to any disclaimer, the term of this patent is extended or adjusted under 35 U.S.C. 154(b) by 77 days.

(21) Appl. No.: 10/577,365

(22) PCT Filed: Oct. 4, 2004

(86) PCT No.: PCT/US2004/032518

§ 371 (c)(1),
(2), (4) Date: Apr. 28, 2006

(87) PCT Pub. No.: WO2005/056682

PCT Pub. Date: Jun. 23, 2005

(65) Prior Publication Data

US 2007/0082478 A1  Apr. 12, 2007

Related U.S. Application Data

(60) Provisional application No. 60/525,542, filed on Nov. 26, 2004.

(51) Int. Cl.
C08K 3/20 (2006.01)
C08G 77/06 (2006.01)
C08G 77/10 (2006.01)

(52) U.S. Cl. ............ 524/457; 524/501; 524/506; 524/837

(58) Field of Classification Search ........... 524/837, 524/731; 528/25–28, 33, 24; 525/100–104
See application file for complete search history.

(56) References Cited

U.S. PATENT DOCUMENTS

| 2,891,920 | A | * | 6/1959 | Hyde et al. ............. 524/714 |
| 2,965,593 | A | * | 12/1960 | Dietz .................... 524/457 |
| 3,294,725 | A | | 12/1966 | Findlay et al. |
| 3,428,707 | A | * | 2/1969 | Amos et al. ............ 525/101 |
| 3,436,252 | A | * | 4/1969 | Neuroth ................. 428/447 |
| 3,575,910 | A | | 4/1971 | Thomas |
| 3,879,491 | A | * | 4/1975 | Lindsey et al. .......... 525/479 |
| 3,898,300 | A | * | 8/1975 | Hilliard ................. 525/106 |
| 4,138,387 | A | * | 2/1979 | Bluestein ............... 524/425 |
| 4,211,729 | A | * | 7/1980 | Marquardt et al. ....... 525/106 |
| 4,288,356 | A | * | 9/1981 | Huebner et al. ......... 524/501 |
| 4,987,180 | A | * | 1/1991 | Ohata et al. ............ 524/860 |
| 4,999,398 | A | | 3/1991 | Graiver et al. |
| 5,100,958 | A | * | 3/1992 | Fuhr et al. ............. 525/66 |
| 5,360,851 | A | * | 11/1994 | Feder et al. ............ 524/157 |
| 5,502,105 | A | | 3/1996 | Revis |
| 5,661,215 | A | | 8/1997 | Gee et al. |
| 5,932,651 | A | * | 8/1999 | Liles et al. ............. 524/838 |
| 6,316,541 | B1 | * | 11/2001 | Gee ..................... 524/714 |
| 6,953,821 | B2 | * | 10/2005 | Tamori et al. .......... 524/457 |

FOREIGN PATENT DOCUMENTS

| EP | 1172412 A1 | * | 1/2002 |
| EP | 1172412 A1 | * | 1/2002 |
| EP | 1217010 A1 | * | 6/2002 |

* cited by examiner

*Primary Examiner*—Randy Gulakowski
*Assistant Examiner*—Robert Loewe
(74) *Attorney, Agent, or Firm*—Alan Zombeck

(57) ABSTRACT

Emulsion compositions containing a silicone polymer and organic polymer as an alloy and/or hybrid emulsion can be made by (i) first forming an emulsion containing a silicone polymer by emulsion polymerization in which (a) the ring of a cyclic siloxane oligomer is opened, in which (b)an hydroxy endblocked siloxane oligomer is condensed, using an acid or base catalyst in the presence of water, or in which (c) an hydrogen endblocked siloxane oligomer and a vinyl endblocked siloxane oligomer are reacted by hydrosilylation using a catalyst; (ii) adding to the emulsion in (i) the components for preparing an emulsion containing an organic polymer by free radical emulsion polymerization of an ethylenically unsaturated organic monomer, and (iii) heating the emulsion. The resulting coalesced compositions produce polymer blends or alloys whose properties are influenced by the composition and morphology of the hybrid emulsion particles. The compositions may be spray dried whenever it is desired to employ the particles in powder type applications. In an embodiment, the two emulsions are prepared separately of one another and then combined.

12 Claims, No Drawings

SILICONE POLYMER AND ORGANIC POLYMER CONTAINING ALLOY AND/OR HYBRID EMULSION COMPOSITIONS

CROSS REFERENCE TO RELATED APPLICATIONS

This application is a U.S. national stage filing under 35 U.S.C. §371 of PCT Application No. PCT/US2004/032518 filed on Oct. 4, 2004, currently pending, which claims the benefit of U.S. Provisional Patent Application No. 60/525542 filed Nov. 26, 2004 under 35 U.S.C. §119 (e). PCT Application No. PCT/US2004/032518 and U.S. Provisional Patent Application No. 60/525542 are hereby incorporated by reference.

This invention relates to silicone polymer and organic polymer containing alloy and/or hybrid emulsion compositions. In particular, the silicone polymer is a polysiloxane free of trifunctional T units $RSiO_{3/2}$ and tetrafunctional Q units $SiO_{4/2}$, and the organic polymer is a polymer free of silicon atoms. The alloy and/or hybrid emulsion contains particles based on a hybrid structure of substantially immiscible linear silicone polymers and organic polymers. Upon film formation or particle coalescence, an intimate polymer blend or polymer alloy is formed with limited degrees of interpenetration.

The prior art is replete with patents relating to emulsions containing silicone-organic copolymers. Representative of the state of the art relevant to this invention is U.S. Pat. No. 3,575,910 (Apr. 20, 1971). The '910 patent, for example, describes aqueous emulsions of certain siloxane-acrylate copolymers. However, the siloxane in the '910 patent used to make the copolymer contains trifunctional T units $RSiO_{3/2}$ to provide reaction of the siloxane with an organic acrylate. Therefore it can be seen that the emulsion in the '910 patent essentially contains resinous type siloxanes and copolymers formed from siloxanes and organic monomers.

However, the emulsion of this invention can be characterized as containing a silicone organic alloy, in other words, an immiscible mixture of two polymers, i.e., a silicone polymer and an organic polymer within each polymer particle. In addition, the emulsion combines the unique characteristics of silicone polymers, with the hydrophilic and/or hydrophobic film forming, barrier and other properties of organic polymers, and in that sense can be considered hybrid emulsions. By contrast, the prior art methods described above provide emulsions of a single copolymer of a siloxane and an organic acrylate monomer. Surprisingly, it has been found that such alloy and/or hybrid emulsion particles can be formed in good yield without the aid of grafting sites.

The emulsions according to this invention fill an unmet need in providing new properties, benefits, and advantages, not possessed by emulsions known heretofore. For example, compositions can be produced in which the emulsion particles can be tailored into various morphologies, i.e., core/shell, micro-domain, and lobed particle. The emulsions are lower cost than state of the art silicone-organic block or graft copolymeric emulsions, and films derived from the emulsions exhibit very different mechanical and feel properties than state of the art emulsions. They possess solid surface tensions intermediate to those of silicone polymers and organic polymers. They also enable one skilled in the art to prepare wide ranges of internal phase emulsion compositions with film properties varying from adhesives to tough hard films.

The invention is directed to a method of making a linear silicone polymer and organic polymer containing alloy and/or hybrid emulsion composition by (i) preparing an emulsion containing a silicone polymer by emulsion polymerization in which (a) the ring of a cyclic siloxane oligomer is opened, in which (b) an hydroxy endblocked siloxane oligomer is condensed, using an acid or base catalyst in the presence of water; or in which (c) an hydrogen endblocked siloxane oligomer and a vinyl endblocked siloxane oligomer are reacted by hydrosilylation using a catalyst; (ii) adding to the emulsion in (i) components for preparing an emulsion containing an organic polymer by free radical emulsion polymerization of one or more ethylenically unsaturated organic monomer(s); and (iii) heating the emulsion.

In an embodiment of the invention, the method of making a silicone polymer and organic polymer containing emulsion composition is carried out by (i) preparing an emulsion containing a silicone polymer by emulsion polymerization in which the ring of a cyclic siloxane oligomer is opened and further condensed using an acid or base catalyst in the presence of water; (ii) separately preparing an emulsion containing an organic polymer by free radical emulsion polymerization of an ethylenically unsaturated organic monomer; and combining the two emulsions.

As used herein, the symbols M, D, T, and Q, represent the functionality of structural units present in organosilicon compounds containing siloxane units joined by ≡Si—O—Si≡ bonds. The monofunctional (M) unit represents $R_3SiO_{1/2}$; the difunctional (D) unit represents $R_2SiO_{2/2}$; the trifunctional (T) unit represents $RSiO_{3/2}$ and results in the formation of branched linear siloxanes; and the tetrafunctional (Q) unit represents $SiO_{4/2}$ which results in the formation of crosslinked and resinous compositions. R typically represents a saturated alkyl group containing 1-6 carbon atoms such as methyl, or an aryl group containing 6-10 carbon atoms such as phenyl, but R can optionally contain unsaturated groups such as vinyl or allyl, or functional groups such as amino or mercapto.

The invention is directed to polymer alloy and/or hybrid emulsion compositions containing a silicone polymer and an organic polymer. As used herein, (i) silicone polymer means a linear polysiloxane species free of trifunctional T units $RSiO_{3/2}$ and tetrafunctional Q units $SiO_{4/2}$ which are capable of providing crosslinking of the silicone polymer or the reaction of the silicone polymer with the organic polymer; (ii) organic polymer means a polymer free of silicon atoms; and (iii) polymer alloy and/or hybrid emulsion means an aqueous oil-in-water (O/W) emulsion containing an immiscible mixture of linear silicone polymers and organic polymers.

Polymer alloy emulsions of the invention can be prepared by combining silicone polymer emulsions prepared by emulsion polymerization, and organic polymer emulsions prepared by free radical emulsion polymerization of acrylate monomers and/or other organic monomers. The silicone polymer emulsions are emulsions containing silicone polymer particles having an average diameter 30-500 nanometer, and in which the viscosity of the internal phase of the silicone emulsion is 2,000-10,000,000 centistoke (mm$^2$/s). The polymer alloy emulsion compositions are substantially two-phase emulsion particles composed of a silicone phase and an organic phase, in which there exists no grafting monomers in the composition, and in which there is no chemical crosslinking between the silicone and organic polymer chains in the emulsion. Rather, the existing chains were entangled at the silicone-organic interface within the particles. The silicone polymer and organic polymer emulsion compositions typically contained a 50:50 weight ratio of the silicone polymer emulsion solids to the acrylate polymer emulsion solids, but any weight ratio of solids can be prepared, depending on the desired properties of the final emulsion.

One process embodiment for preparing polymer alloy emulsions is a semi-continuous process while another process embodiment for preparing polymer alloy emulsions is a monomer swell process. According to the semi-continuous process, the procedure commences with the preparation of a silicone emulsion by emulsion polymerization as a first stage. In the second stage, the organic monomer(s) are then introduced to a reactor continuously over a period of several hours at a temperature of 80-90° C. A water-soluble free radical initiator such as sodium persulfate is then added to the reactor in a separate stream over a period of several hours during addition of the organic monomer(s). In the monomer swell process, it also commences with preparation of a silicone emulsion by emulsion polymerization. However, the organic monomer(s) and an organic free radical azo-type initiator are introduced to the reactor simultaneously and allowed to swell the silicone emulsion particles for a brief period of time. Heating is then increased to activate the initiator, causing the organic monomer(s) to polymerize within the silicone emulsion particles.

Thermal or redox initiation processes are used in the preparation of the organic polymer phase. Conventional thermal free radical initiators which can be used include hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid. These initiators are typically used at a level of 0.01-3.0 percent by weight based on the total weight of monomer. Redox initiators which can be used are typically an oxidant plus a reducing agent in combinations effective to generate free radicals, including the same free radical initiators listed above as the oxidant; and a suitable reductant such as sodium sulfoxylate formaldehyde, ascorbic acid, isoascorbic acid, alkali metal and ammonium salts of sulfur-containing acids such as sodium sulfite, bisulfite, thiosulfate, hydrosulfite, sulfide, hydrosulfide or dithionite, formamidine sulfinic acid, hydroxymethane sulfonic acid, acetone bisulfite; amines such as ethanolamine, glycolic acid, glyoxylic acid hydrate, lactic acid, glyceric acid, malic acid, tartaric acid, as well as salts of the preceding acids which may be used.

Redox reaction catalyzing metal salts of iron, copper, manganese, silver, platinum, vanadium, nickel, chromium, palladium, or cobalt, may optionally be used. The initiator or initiator system can be added in one or more additions, continuously, linearly, or not, over the reaction period, or as combinations thereof. Several azo-type organic free radical initiators which can be used in the monomer swell process such as azobis-isobutyronitrile and azobispropionitrile, which are sold under the trademark VAZO® by E.I. du Pont de Nemours Company.

As used herein, the term emulsion polymerization refers to its accepted meaning in the art, for example, any of the polymerization processes represented by processes described in US Patents U.S. Pat. No. 2,891,920 (Jun. 23, 1959), U.S. Pat. No. 3,294,725 (Dec. 27, 1966), U.S. Pat. No. 4,999,398 (Mar. 12, 1991), U.S. Pat. No. 5,502,105 (Mar. 26, 1996), U.S. Pat. No. 5,661,215 (Aug. 26, 1997), and U.S. Pat. No. 6,316,541 (Nov. 13, 2001).

Emulsion polymerization processes useful in the present invention are typically carried out at a temperature in the range of 25-100° C., preferably 50-95° C., and in the case of silicone emulsion polymerization, most typically involve opening of the ring of a volatile siloxane oligomer using an acid or a base catalyst in the presence of water. Upon opening of the ring, siloxanes with terminal hydroxy groups are formed. These siloxanes then react with one another by a condensation reaction to form the siloxane polymer.

A simplified representation of the process chemistry is shown below for a volatile siloxane oligomer such as octamethylcyclotetrasiloxane, in which Me represents $CH_3$; $(Me_2SiO)_4 + H_2O + Catalyst \rightarrow HOMe_2SiOMe_2SiOMe_2SiOSiMe_2OH \rightarrow HOMe_2SiOMe_2SiOMe_2SiOSiMe_2OH + HOMe_2SiOMe_2SiOMe_2SiOSiMe_2OH \rightarrow HOMe_2SiO(Me_2SiO)_6SiMe_2OH + H_2O$.

It is also feasible to produce linear siloxane polymers through the emulsion polymerization reaction by using oligomers in the reaction medium that contain silanol groups. Such hydroxy endblocked siloxane oligomers generally comprise a silanol terminated polydimethylsiloxane with a degree of polymerization of 1-7. A process similar to the above process occurs in instances when the oligomers consist of siloxanes containing silanol groups: $HOMe_2SiO(Me_2SiO)_{6-15}SiMe_2OH + H_2O + Catalyst + Shear \rightarrow HOMe_2SiO(Me_2SiO)_{600-1500}SiMe_2OH + H_2O$. Siloxane polymers of higher molecular weight can be obtained by allowing both of the processes to continue.

In addition, linear siloxane polymers can be prepared through the emulsion polymerization reaction by using oligomers in the reaction medium that contain vinyl and hydrogen groups that react by chain extension. Such chain extension reactions with polysiloxanes involve the hydrosilylation reaction in which an Si—H groups reacts with aliphatically unsaturated groups in the presence of platinum or rhodium containing catalysts. Alternatively, such reactions can involve reactions between Si—OH groups with alkoxy groups in alkoxysilanes, silicates, or alkoxysiloxanes, in the presence of a metal containing catalyst. Still other reactions can involve reaction of an Si—OH group with $CH_3COOSi$— groups in the presence of water; or the reaction of Si—OH groups with an Si—H group in the presence of a metal containing catalyst.

A typical reaction consists of a dimethylvinylsiloxy terminated polydimethylsiloxane (Vi-PDMS) having a viscosity of 7,000-12,000 $mm^2/sec$ at 25° C.; 0.9 parts of a liquid organohydrogen polysiloxane having an average formula of $Me_2HSiO(Me_2SiO)_{20}SiMe_2H$ and containing 0.16-0.20 percent Si—H; and 0.015 parts of platinum in a platinum catalyst material. The following process illustrates what occurs in instances where the oligomers consist of siloxanes containing vinyl and hydrogen groups: $Vi-PDMS + Me_2HSiO(Me_2SiO)_{20}SiMe_2H + surfactant + H_2O + Metal Catalyst + Shear \rightarrow Vi-Me_2SiO(Me_2SiO)_{10,000-270,000}SiHMe_2 + H_2O$. Siloxane polymers of very high molecular weight can be obtained by this process.

Catalysts used in such processes include strong mineral acids such as hydrochloric acid; strong alkaline catalysts such as sodium hydroxide; quaternary ammonium hydroxides; surface active sulfonic acids such as dodecylbenzene sulfonic acid and the sodium salts thereof; silanolates; and organosilanolates. Other examples of suitable catalysts can be found in U.S. Pat. Nos. 2,891,920; 3,294,725; 4,999,398; 5,502, 105; 5,661,215; and 6,316,541.

Some representative cyclic siloxanes are hexamethylcyclotrisiloxane, a solid at room temperature, with a boiling point of 134° C. and formula $(Me_2SiO)_3$; octamethylcyclotetrasiloxane ($D_4$) with a boiling point of 176° C., viscosity of 2.3 $mm^2/s$, and formula $(Me_2SiO)_4$; decamethylcyclopentasiloxane with a boiling point of 210° C., viscosity of 3.87 $mm^2/s$, and formula $(Me_2SiO)_5$; and dodecamethylcyclohexasiloxane with a boiling point of 245° C., viscosity of 6.62 $mm^2/s$, and formula $(Me_2SiO)_6$. It is possible to use other types of cyclic siloxanes such as cyclic siloxanes containing saturated alkyl groups with 2-30 carbon atoms, or cyclic siloxanes in which Si—H groups are used in place of one or more of the Si—Me groups present.

The emulsions containing the silicone polymer useful in the present invention can contain anionic surfactants, cationic surfactants, and nonionic surfactants. The anionic surfactants include sulfonic acids and their salt derivatives. Some examples of anionic surfactants are alkali metal sulfosuccinates; sulfonated glyceryl esters of fatty acids such as sulfonated monoglycerides of coconut oil acids; salts of sulfonated monovalent alcohol esters such as sodium oleyl isothionate; amides of amino sulfonic acids such as the sodium salt of oleyl methyl tauride; sulfonated products of fatty acid nitriles such as palmitonitrile sulfonate; sulfonated aromatic hydrocarbons such as sodium alpha-naphthalene monosulfonate; condensation products of naphthalene sulfonic acids with formaldehyde; sodium octahydro anthracene sulfonate; alkali metal alkyl sulfates; ether sulfates having alkyl groups of eight or more carbon atoms such as sodium lauryl ether sulfate; and alkylaryl sulfonates having one or more alkyl groups of eight or more carbon atoms such as neutral salts of hexadecylbenzene sulfonic acid and $C_{20}$ alkylbenzene sulfonic acid.

Commercial anionic surfactants which can be used include the sodium salt of dodecylbenzene sulfonic acid sold under the trademark SIPONATE® DS-10 by Alcolac Inc., Baltimore, Md.; sodium n-hexadecyl diphenyloxide disulfonate sold under the trademark DOWFAX® 8390 by The Dow Chemical Company, Midland, Mich.; the sodium salt of a secondary alkane sulfonate sold under the trademark HOSTAPUR® SAS 60 by Clariant Corporation, Charlotte, N.C.; N-acyl taurates such as sodium N-lauroyl methyl taurate sold under the trademark NIKKOL LMT® by Nikko Chemicals Company, Ltd., Tokyo, Japan; and linear alkyl benzene sulfonic acids sold under the trademark BIO-SOFT® S-100 by the Stepan Company, Northfield, Ill. Compositions of the latter type such as dodecylbenzene sulfonic acid, although a catalyst as noted above, can also function as the anionic surfactant when neutralized.

Cationic surfactants useful herein include compounds containing quaternary ammonium hydrophilic moieties in the molecule which are positively charged, such as quaternary ammonium salts represented by $R3R4R5R6N^+X^-$ where R3 to R6 are alkyl groups containing 1-30 carbon atoms, or alkyl groups derived from tallow, coconut oil, or soy; and X is halogen, i.e., chlorine or bromine. Dialkyl dimethyl ammonium salts can be used and are represented by $R7R8N^+(CH_3)_2 X^-$ where R7 and R8 are alkyl groups containing 12-30 carbon atoms or alkyl groups derived from tallow, coconut oil, or soy; and X is halogen. Monoalkyl trimethyl ammonium salts can be used and are represented by $R9N^+(CH_3)_3X^-$ where R9 is an alkyl group containing 12-30 carbon atoms or an alkyl group derived from tallow, coconut oil, or soy; and X is halogen.

Representative quaternary ammonium salts are dodecyltrimethyl ammonium chloride/lauryltrimethyl ammonium chloride (LTAC), cetyltrimethyl ammonium chloride (CTAC), didodecyldimethyl ammonium bromide, dihexadecyldimethyl ammonium chloride, dihexadecyldimethyl ammonium bromide, dioctadecyldimethyl ammonium chloride, dieicosyldimethyl ammonium chloride, didocosyldimethyl ammonium chloride, dicoconutdimethyl ammonium chloride, ditallowdimethyl ammonium chloride, and ditallowdimethyl ammonium bromide. These quaternary ammonium salts are commercially available under trademarks such as ADOGEN®, ARQUAD®, TOMAH®, and VARIQUAT®.

Commercially available nonionic surfactants which can be used include compositions such as 2,6,8-trimethyl-4-nonyloxy polyethylene oxyethanols (6EO) and (10EO) sold under the trademarks TERGITOL® TMN-6 and TERGITOL® TMN-10; alkyleneoxy polyethylene oxyethanol ($C_{11-15}$ secondary alcohol ethoxylates 7EO, 9EO, and 15EO) sold under the trademarks TERGITOL® 15-S-7, TERGITOL®15-S-9, TERGITOL® 15-S-15; other $C_{11-15}$ secondary alcohol ethoxylates sold under the trademarks TERGITOL® 15-S-12, 15-S-20, 15-S-30, 15-S-40; and octylphenoxy polyethoxy ethanol (40EO) sold under the trademark TRITON® X-405. All of these surfactants are sold by Union Carbide Corporation, Danbury, Conn.

Other useful commercial nonionic surfactants are nonylphenoxy polyethoxy ethanol (10EO) sold under the trademark MAKON® 10 by Stepan Company, Northfield, Ill.; polyoxyethylene 23 lauryl ether (Laureth-23) sold commercially under the trademark BRIJ® 35L by ICI Surfactants, Wilmington, Del.; and RENEX® 30, a polyoxyethylene ether alcohol sold by ICI Surfactants, Wilmington, Del. When preparing silicone oil-in-water emulsions by emulsion polymerization, the presence of a nonionic surfactant is optional. However, when one is present, it is preferably present in combination with another surfactant such as an anionic or cationic surfactant.

Protective colloids, i.e., colloidal stabilizers, may be used, if desired, to enhance stability or to provide a specific rheological characteristic to the emulsion. As used herein, the terms protective colloid and/or colloidal stabilizer mean a nonionic molecule that is an effective agent for protecting charged colloidal particles in an aqueous media against flocculation. These compositions typically have a weight average molecular weight between 1,000-300,000 and are typically more hydrophilic than the composition of the first emulsion polymer, as measured by weight-averaged solubility parameters. Colloidal stabilizers which can be used include hydroxyethyl cellulose having a weight average molecular weight between 50,000-150,000; N-vinyl pyrrolidone; polyvinyl alcohol having a weight average molecular weight between 10,000-200,000; partially acetylated polyvinyl alcohol; carboxymethyl cellulose; gums such as gum arabic; starches; proteins; and mixtures thereof Preferred colloidal stabilizers are hydroxethyl cellulose and polyvinyl alcohol.

Since emulsions are susceptible to microbiological contamination a preservative can be added. Representative preservatives, which can be used include formaldehyde; 1,3-dimethylol-5,5-dimethyl hydantoin, i.e., DMDM Hydantoin; 5-bromo-5-nitro-1,3-dioxane; methyl or propyl paraben; sorbic acid; imidazolidinyl urea; and KATHON® CG (5-chloro-2-methyl-4-isothiazolin-3-one).

Generally, the silicone emulsions contain a siloxane polymer concentration of 10 to 70 percent by weight based on the weight of the total emulsion, preferably 25 to 60 percent by weight. While emulsions containing less than 10 percent siloxane polymer content can be made, such emulsions hold little or no economic value. The surfactant is generally present at 0.05-30 percent by weight based on the weight of the total emulsion, preferably 0.1 to 20 percent by weight. Water and optional ingredients constitute the balance of the emulsion to 100 percent.

Various types of ethylenically unsaturated and/or vinyl containing organic monomers can be used for the organic phase including acrylates, methacrylates, substituted acrylates, substituted methacrylates, vinyl halides, fluorinated acrylates, and fluorinated methacrylates, for example. Some representative compositions include acrylate esters and methacrylate esters such as methyl acrylate, ethyl acrylate, butyl acrylate, 2-ethylhexyl acrylate, methyl methacrylate, decyl acrylate, lauryl acrylate, isodecyl methacrylate, lauryl methacrylate, and butyl methacrylate; substituted acrylates and methacrylates such as hydroxyethyl acrylate, perfluorooctyl acrylate, hydroxypropyl acrylate, hydroxypropyl methacrylate, and hydroxyethyl methacrylate; vinyl halides such as vinyl chloride, vinylidene chloride, and chloroprene; vinyl esters such as vinyl acetate and vinyl butyrate; vinyl pyrrolidone; conjugated dienes such as butadiene and isoprene; vinyl aromatic compounds such as styrene and divinyl benzene; vinyl monomers such as ethylene; acrylonitrile and methacrylonitrile; acrylamide, methacrylamide, and N-methylol acrylamide; and vinyl esters of monocarboxylic acids with up to 10 carbon atoms such as compositions sold under the trademarks VeoVa-9® and VeoVa-10® by Shell Chemical Oil Company, Houston, Tex.

In the polymerization technique for preparing the organic polymer phase, the monomer may be added in one or more additions which can be carried out continuously or linearly over the reaction period, or in combinations thereof. (i) The organic polymer phase may contain 0-5 percent by weight, preferably 0.5-2 percent by weight, based on the polymer weight, of a copolymerized monoethylenically unsaturated acid group containing monomer, based on the weight of the polymer, such as acrylic acid, methacrylic acid, crotonic acid, itaconic acid, fumaric acid, maleic acid, monomethyl itaconate, monomethyl fumarate, monobutyl fumarate, maleic anhydride, sulfoethyl methacrylate, and phosphoethyl methacrylate. (ii) The organic polymer phase may also contain 0-5 percent by weight, preferably 0-2 percent by weight, based on polymer weight, of a copolymerized monoethylenically unsaturated amino-group containing monomer, based on the weight of the polymer, such as t-butylaminoethyl (meth)acrylate. (iii) The organic polymer phase may further contain 0-2 percent by weight, based on the polymer weight, of a copolymerized multiethylenically unsaturated monomer such as allyl methacrylate, diallyl phthalate, 1,4-butylene glycol dimethacrylate, 1,2-ethylene glycol dimethacrylate, 1,6-hexanediol diacrylate, and divinyl benzene.

In addition, the organic polymer phase may contain 0-5 percent by weight based on the polymer weight, of alternative anionic surfactants such as polymeric surfactants, including polyacrylic gels; copolymerizable surfactants such as hydroxyethyl methacrylate containing 10 moles ethylene oxide units (EO), salts of unsaturated fatty acids such as amine salts of oleic acid, and alpha-olefin sulfonates; and anionic or nonionic copolymerizable surfactants such as compositions sold under the trademark MAXEMUL® 5010, MAXEMUL®5011, MAXEMUL®6106, or MAXEMUL®6112, by Uniqema (ICI Surfactants), Wilmington, Del.

Chain transfer agents can be added to the organic polymer phase including halogen compounds such as tetrabromomethane; allyl compounds; or mercaptans such as alkyl thioglycolates, alkyl mercaptoalkanoates. The $C_4$-$C_{22}$ linear or branched alkyl mercaptans may be used to lower the molecular weight of the formed polymer, and/or provide a different molecular weight distribution than would otherwise have been obtained with any free radical generating initiator(s). In such case, linear or branched $C_4$-$C_{22}$ alkyl mercaptans such as n-dodecyl mercaptan and t-dodecyl mercaptan are preferred. Chain transfer agent(s) may be added in one or more additions, continuously, or linearly, and coordinated with the monomer addition, over most or all of the entire reaction period, or during limited portion(s) of the reaction period.

The emulsion may be coagulated and subsequently dried to obtain the silicone organic alloy and/or hybrid polymer without water. The coagulation step can be carried out by various coagulation methods, such as aqueous electrolyte (salt) coagulation using an aqueous solution of a salt of an inorganic acid such as sodium chloride, magnesium acetate, or calcium hypophosphite. It is preferred that the electrolyte solution be prepared with a salt containing a divalent cation such as calcium chloride ($CaCl_2$). Coagulation with a water soluble or partially water soluble solvent such as methanol is also possible. It is preferred to coagulate the first aqueous particle dispersion using aqueous electrolyte coagulation, wherein the aqueous electrolyte solution has a concentration of 0.1-2.0 percent by weight, preferably 0.2-1.0 percent by weight. It is important to control the coagulation temperature, since too high a coagulation temperature results in excessively large particles, causing poor dispersion. In contrast, too low a temperature results in excessively small particles, resulting in a wide particle size span and the generation of excessive dust.

The resulting coagulated slurry is then dried to less than 5 percent by weight of water to form a free flowing powder. Various methods of drying particle slurries are described in Chemical Engineer's Handbook, 5th Ed., Perry and Chilton, Eds. 1973, which relates to the drying of solid-liquid particle dispersions. The preferred drying methods can include fluidized bed dryers, rotary dryers, spray dryers, continuous or batch tray dryers, flash dryers, and pneumatic conveying dryers. During the drying step, it is important to control the drying temperature so that the slurry particles do not fuse among themselves. This can be accomplished by maintaining the temperature of the slurry particles below the $T_g$ of the organic polymer components. If the drying temperature is too high, then the individual polymer particles may fuse together in the powder particles, which may hinder their subsequent dispersion into formulations. A free flowing, low dust powder can be achieved when the water content is less than 5 percent by weight, preferably less than 3 percent by weight, most preferably less than 1 percent by weight.

Some preferred ethylenically unsaturated organic monomers useful herein and a simplified depiction of their polymerization are shown below wherein R can represent methyl, ethyl, 2-ethylhexyl, 2-hydroxyethyl, or 2-hydroxypropyl groups.

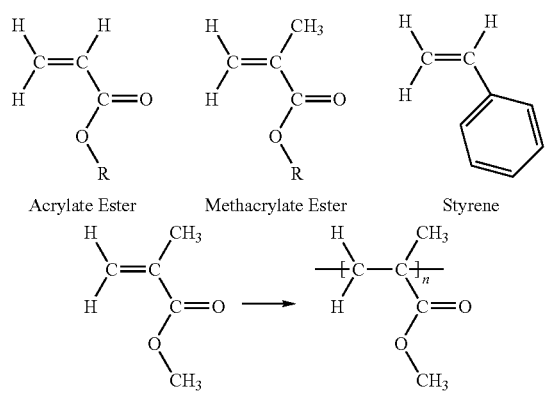

Free Radical Polymerization of Methyl Methacrylate to Poly(methylmethacrylate)

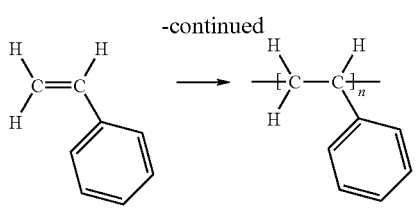

Free Radical Polymerization of Styrene to Polystyrene

The emulsions prepared according to this invention are useful as binder additives for automotive coating and industrial coating applications.

EXAMPLES

The following examples are set forth in order to illustrate the invention in more detail.

Example 1

Preparation of a High Viscosity Silicone Emulsion by Emulsion Polymerization

To a one liter glass reactor fitted with a Teflon® paddle stirrer, condenser, and three addition ports, was added 390.0 gram of water, 23.47 gram of nonionic surfactant polyoxyethylene (23) lauryl ether, and 23.70 gram of dodecylbenzenesulfonic acid. The acid functions as the catalyst, and as an anionic surfactant when neutralized. The mixture was heated to 95° C. with mixing. When the temperature reached 95° C., 272.8 grams of octamethylcyclotetrasiloxane $D_4$ was added and allowed to react for 3 hours. The emulsion was cooled to 30° C. and stirred for an additional 3 hours. The emulsion was neutralized with 23.40 grams of a 50 percent aqueous solution of triethanolamine (TEA) and allowed to cool to room temperature with stirring. The resulting silicone emulsion had a non-volatile content of 44.3 percent, a particle size of 84 nanometer (0.084 micrometer), and an internal silicone phase viscosity of 140,000 centipoise (mPa·s).

Example 2

Silicone-Poly (Methyl Methacrylate) Emulsion using a Semi-Continuous Process

A one liter reactor was charged with 361.2 gram of the silicone emulsion from Example 1 and 0.1 gram of sodium persulfate. The mixture was heated to 85° C. with mixing. When the temperature reached 85° C., separate monomer and aqueous feeds were started, using liquid metering pumps. The monomer feed consisted of 153.08 gram of methyl methacrylate which was added over 2 hours. The aqueous feed was added over 2.5 hours and consisted of 205.7 gram of deionized water, 0.82 gram of sodium persulfate, and 0.30 grams of sodium bicarbonate. After 2.5 hours, 0.1 gram of sodium persulfate was added, and the reaction was stirred for an additional 0.5 hour. The emulsion was allowed to cool to room temperature with stirring. The final emulsion had a non-volatile content of 43.6 percent and a particle size of 82 nanometer (0.082 micrometer).

Example 3

Silicone-Poly (Butyl Acrylate/Styrene) Emulsion using a Semi-Continuous Process

A one liter reactor was charged with 359.5 gram of a silicone emulsion having essentially the same composition as the silicone emulsion from Example 1. It had a particle size of 112 nm (0.112 micrometer), an internal phase viscosity of 110,000 cP (mPa·s), and a non-volatile content of 42.3 percent. To the emulsion was added 0.1 gram of sodium persulfate, and the emulsion was heated to 85° C. with mixing. When the temperature reached 85° C., separate monomer and aqueous feeds were started using liquid metering pumps. The monomer feed consisted of 76.5 gram of butyl acrylate and 76.5 gram of styrene which was added over 2 hours. The aqueous feed was added over 2.5 hours and consisted of 206.4 gram of deionized water, 0.6 gram of sodium persulfate, and 0.3 gram of sodium bicarbonate. After 2.5 hours, 0.1 gram of sodium persulfate was added, and the reaction was stirred for an additional 0.5 hour. The emulsion was allowed to cool to room temperature with stirring. The final emulsion had a non-volatile content of 42.6 percent and a particle size of 86 nanometer (0.086 micrometer).

Example 4

Silicone-Poly (Butyl Acrylate) Emulsion using a Semi-Continuous Process

A one liter reactor was charged with 360.7 gram of a silicone emulsion having essentially the same composition as the silicone emulsion from Example 1. It had a particle size of 114 nm (0.114 micrometer), an internal phase viscosity of 170,000 cP (mPa·s), and a non-volatile content of 44.3 percent. To the emulsion was added 0.1 gram of sodium persulfate, and the emulsion was heated to 85° C. with mixing. When the temperature reached 85° C., separate monomer and aqueous feeds were started using liquid metering pumps. The monomer feed consisted of 153.5 gram of butyl acrylate which was added over 2 hours. The aqueous feed was added over 2.5 hours and it consisted of 205.8 gram of deionized water, 0.6 gram of sodium persulfate and 0.3 gram of sodium bicarbonate. After 2.5 hours, 0.1 gram of sodium persulfate was added, and the reaction was stirred for an additional 0.5 hour. The emulsion was allowed to cool to room temperature with stirring. The final emulsion had a non-volatile content of 43.6 percent and a particle size of 85 nanometer (0.085 micrometer).

Example 5

Silicone-Poly (Methyl Acrylate) Emulsion using a Semi-Continuous Process

A one liter reactor was charged with 360.8 gram of a silicone emulsion having essentially the same composition as the silicone emulsion from Example 1. It had a particle size of 115 nm (0.115 micrometer), an internal phase viscosity of 160,000 cP (mPa·s), and a non-volatile content of 44.3 percent. The emulsion was heated to 85° C. with mixing. When the temperature reached 85° C., separate monomer and aqueous feeds were started using liquid metering pumps. The monomer feed consisted of 153.1 gram of methyl acrylate which was added over 2 hours. The aqueous feed was added over 2.5 hours and consisted of 205.7 gram of deionized water, 0.6 gram of sodium persulfate, and 0.3 gram of sodium bicarbonate. After 2.5 hours, 0.1 gram of sodium persulfate was added, and the reaction was stirred for an additional 0.5 hour. The emulsion was allowed to cool to room temperature with stirring. The final emulsion had a non-volatile content of 43.6 percent and a particle size of 152 nanometer (0.150 micrometer).

Example 6

Silicone-Poly (Methyl Acrylate) Emulsion using a Monomer Swell Process

A one liter reactor was charged with 252.0 gram of a silicone emulsion having essentially the same composition as the silicone emulsion from Example 1. It had a particle size of 76.5 nm (0.0765 micrometer), an internal phase viscosity of 200,000 cP (mPa·s), and a non-volatile content of 44.3 percent. With continuous mixing, 379.2 gram of deionized water, 111.0 gram of methyl acrylate, and 1.1 grams of a VAZO® initiator were added to the silicone emulsion, and mixed for 4 hours at room temperature. The temperature of the reactor was brought to 85° C. to initiate polymerization, held at that temperature for 2 hours, and then cooled to room temperature with stirring. The final emulsion had a non-volatile content of 30.0 and a particle size of 84 nanometer (0.084 micrometer).

Example 7

Silicone-Poly (Butyl Acrylate) Emulsion using a Monomer Swell Process

A one liter reactor was charged with 250.1 gram of a silicone emulsion having essentially the same composition as the silicone emulsion from Example 1. It had a particle size of 99 nanometer (0.099 micrometer), an internal phase viscosity of 167,000 cP (mPa·s), and a non-volatile content of 44.4 percent. With continuous mixing, 379.2 gram of deionized water, 110.8 gram of butyl acrylate, and 0.6 gram of a VAZO® initiator were added to the silicone emulsion, and mixed for 4 hours at room temperature. The temperature of the reactor was brought to 85° C. to initiate polymerization, held at that temperature for 2 hours, and then cooled to room temperature with stirring. The final emulsion had a non-volatile content of 30.0 percent and a particle size of 95 nanometer (0.095 micrometer).

Example 8

Poly (Butyl Acrylate) Emulsion using a Semi-Continuous Process

A one liter reactor was charged with 283.5 gram of water, 6.1 grams of nonionic surfactant nonylphenoxy polyethylene (9) ethanol, 5.5 gram of anionic surfactant ammonium lauryl sulfate $CH_3(CH_2)_{10}CH_2OSO_3NH_4$, and 0.3 gram of sodium persulfate. The mixture was heated to 85° C. with mixing. When the temperature reached 85° C., separate monomer and aqueous feeds were started using liquid metering pumps. The monomer feed consisted of 306.7 gram of butyl acrylate which was added over 3.7 hours. The aqueous feed was added over 4.3 hours and consisted of 100.2 gram of deionized water, 0.8 gram of sodium persulfate, and 0.6 gram of sodium bicarbonate. After 4.3 hours, 0.6 gram of sodium persulfate in 28.5 gram of water was added, and the reaction was stirred without heating for an additional 0.5 hour. The emulsion was allowed to cool to room temperature with stirring. The final emulsion had a non-volatile content of 43.7 percent and a particle size of 111 nanometer (0.111 micrometer).

Example 9

Poly (Butyl Acrylate) Emulsion/Silicone Emulsion Blend

A mixture was prepared containing 50 gram of the poly (butyl acrylate) emulsion of Example 8 and 50 gram of the silicone emulsion of Example 1. The mixture was blended in a laboratory mixing device at 300 rpm for 30 minutes. The content of the blend was 1:1 of the organic component to the silicone component based on a total of 100 gram. The resulting emulsion blend was found to be homogenous and stable. This example represents an alternative embodiment of the invention in which the two emulsions are prepared separately and then combined.

In addition to the several advantages and benefits noted above in the Background of the Invention, these emulsions offer significant cost advantages, in the sense that the silicone starting materials consist of relatively inexpensive cyclic siloxanes, compared to state of the art emulsions containing silicone-organic copolymers which are made with expensive crosslinking agents such as functional silanes. They also have improved emulsion stability as the polymers they contain are thermoplastic and therefore the mechanical properties of the emulsions can be easily varied. Furthermore, since the process employs no crosslinking agents such as alkoxysilanes, the silicone polymer in the emulsion is not crosslinked, i.e., it contains no T units or other functional group capable of crosslinking it or crosslinking it with the organic polymer. Thus, their lack of self-reactive functional groups significantly minimizes any potential for inter-particle and/or intra-particle crosslinking occurring in the emulsion. The emulsion compositions do not contain a silicone-organic copolymer but a silicone-organic alloy.

Other variations may be made in compounds, compositions, and methods described herein without departing from the essential features of the invention. The embodiments of the invention specifically illustrated herein are exemplary only and not intended as limitations on their scope except as defined in the appended claims.

The invention claimed is:

1. A method of making a silicone polymer and organic polymer containing alloy emulsion composition comprising; (i) preparing an emulsion containing a linear silicone polymer free of trifunctional T units $RSiO_{3/2}$ and tetrafunctional Q units $SiO_{4/2}$ by emulsion polymerization in which (a) the ring of a cyclic siloxane oligomer is opened, in which (b) an hydroxy endblocked siloxane oligomer is condensed, using an acid or base catalyst in the presence of water, or in which (c) an hydrogen endblocked siloxane oligomer and a vinyl endblocked siloxane oligomer are reacted by hydrosilylation using a catalyst; (ii) adding to the emulsion in (i) one or more ethylenically unsaturated organic monomer components for preparing an organic polymer emulsion by free radical emulsion polymerization; and (iii) heating the emulsion from (ii); wherein the polymer alloy emulsion compositions are substantially two-phase emulsion particles composed of a silicone phase and an organic phase, in which there exists no grafting monomers in the composition, and in which there is no chemical crosslinking between the silicone and organic polymer chains in the emulsion.

2. A method according to claim 1 in which the ethylenically unsaturated organic monomer is an acrylate ester, a methylacrylate ester, a fluorinated acrylate, a fluorinated methacrylate, acrylic acid, methacrylic acid, allyl methacrylate, dimethylaminoethyl methacryate, a vinyl halide, a vinyl ester, a vinyl aromatic compound, a vinyl ester of a monocarboxylic acid, or a vinyl pyrrolidone.

3. A method according to claim 1 in which the components in (ii) comprise one or more organic monomers and a free radical initiator, and the components are added to the emulsion in (i) separately.

4. A method according to claim 1 in which the components in (ii) comprise one or more organic monomers and a free radical initiator, and the components are added to the emulsion in (i) simultaneously.

5. A method according to claim 1 in which the silicone polymer in (i) comprises a linear siloxane free of trifunctional T units $RSiO_{3/2}$ and tetrafunctional Q units $SiO_{4/2}$ capable of providing crosslinking of the silicone polymer or the reaction of the silicone polymer with the organic polymer; the organic polymer comprises a polymer free of silicon atoms; and the resulting emulsion is an aqueous emulsion containing an immiscible mixture of linear silicone polymers and organic polymers.

6. A method according to claim 1 in which the ethylenically unsaturated organic monomer is selected from the group consisting of butyl acrylate, methyl acrylate, methyl methacrylate, methacrylic acid, allyl methacrylate, dimethylaminoethyl methacryate, 2-ethylhexyl acrylate, vinyl acetate, vinyl esters of monocarboxylic acids, vinyl pyrrolidone, and styrene.

7. A method according to claim 1 in which the silicone polymer emulsion in (i) contains silicone polymer particles having an average particle diameter of 30-500 nanometer, and the viscosity of the phase containing the silicone polymer is 2,000-10,000,000 centistoke ($mm^2/s$).

8. A method of making a silicone polymer and organic polymer, containing alloy emulsion composition comprising (i) preparing a first emulsion containing a linear silicone polymer free of trifunctional T units $RSiO_{3/2}$ and tetrafunctional Q units $SiO_{4/2}$ by emulsion polymerization in which (a) the ring of a cyclic siloxane oligomer is opened, in which (b) an hydroxy endblocked siloxane oligomer is condensed, using an acid or base catalyst in the presence of water, or in which (c) an hydrogen endblocked siloxane oligomer and a vinyl endblocked siloxane oligomer are reacted by hydrosilylation using a catalyst; (ii) preparing a second emulsion containing an organic polymer by free radical emulsion polymerization of an ethylenically unsaturated organic monomer; and combining the first and second emulsions; wherein the polymer alloy emulsion compositions are substantially two-phase emulsion particles composed of a silicone phase and an organic phase. in which there exists no grafting monomers in the composition, and in which there is no chemical crosslinking between the silicone and organic polymer chains in the emulsion.

9. A method according to claim 8 in which the ethylenically unsaturated organic monomer is an acrylate ester, a methylacrylate ester, a vinyl halide, a vinyl ester, or a vinyl aromatic compound.

10. A method according to claim 8 in which the silicone polymer in (i) comprises a linear siloxane free of trifunctional T units $RSiO_{3/2}$ and tetrafunctional Q units $SiO_{4/2}$ capable of providing crosslinking of the silicone polymer or the reaction of the silicone polymer with the organic polymer; the organic polymer comprises a polymer free of silicon atoms; and the resulting emulsion is an aqueous emulsion containing an immiscible mixture of linear silicone polymers and organic polymers.

11. A method according to claim 8 in which the ethylenically unsaturated organic monomer is selected from the group consisting of butyl acrylate, methyl acrylate, methyl methacrylate, methacrylic acid, allyl methacrylate, dimethylaminoethyl methacryate, 2-ethylhexyl acrylate, vinyl acetate, vinyl esters of monocarboxylic acids, vinyl pyrrolidone, and styrene.

12. A method according to claim 8 in which the first emulsion contains silicone polymer particles having an average particle diameter of 30-500 nanometer, and the viscosity of the phase containing the silicone polymer is 2,000-10,000,000 centistoke ($mm^2/s$).

\* \* \* \* \*